Feb. 17, 1953 H. H. REUTHER 2,628,683
ROTOR MEANS FOR HELICOPTERS AND THE LIKE
Filed April 1, 1947 9 Sheets-Sheet 1

INVENTOR:
Harold H. Reuther,
BY
Alfred E. Ockinger
ATTORNEY

Feb. 17, 1953 — H. H. REUTHER — 2,628,683
ROTOR MEANS FOR HELICOPTERS AND THE LIKE
Filed April 1, 1947 — 9 Sheets-Sheet 3

INVENTOR:
Harold H. Reuther,
BY
Alfred E. Iselinger
ATTORNEY.

Feb. 17, 1953 H. H. REUTHER 2,628,683
ROTOR MEANS FOR HELICOPTERS AND THE LIKE
Filed April 1, 1947 9 Sheets-Sheet 8

INVENTOR:
Harold H. Reuther,
BY
Alfred E. Ischinger
ATTORNEY

Feb. 17, 1953 — H. H. REUTHER — 2,628,683
ROTOR MEANS FOR HELICOPTERS AND THE LIKE
Filed April 1, 1947 — 9 Sheets-Sheet 9

INVENTOR:
Harold H. Reuther,
BY
Alfred E. Ischinger
ATTORNEY.

Patented Feb. 17, 1953

2,628,683

UNITED STATES PATENT OFFICE 2,628,683

ROTOR MEANS FOR HELICOPTERS AND THE LIKE

Harold H. Reuther, Chester, Pa.

Application April 1, 1947, Serial No. 738,559

2 Claims. (Cl. 170—135.7)

This invention relates to aircraft of the helicopter or direct lift type, and more particularly pertains to the lifting means, and flight control means, of such aircraft.

Various types of lifting means, or rotor means, have heretofore been devised for aircraft of the helicopter or direct lift type. One such means comprises a rotor provided with a circular arrangement of uniformly spaced pivoted wing, plane, or blade elements, each of which has an individual pivoting axis disposed at an angle of substantially 45° with respect to the longitudinal axis of the rotor. The said elements are mounted and arranged so that they can be positionally adjusted by simultaneous movement thereof about their respective pivotal axis, in one direction or the other, within certain limits. This type of rotor means, when properly installed in an aircraft, provides a wing system, propeller, or lifting screw arrangement, having certain important advantages over other arrangements of this general type. The construction and operation of this type rotor means, is fully disclosed in the following U. S. patents: 1,954,862, R. Chillingworth, April 17, 1934; 2,012,987, R. Chillingworth, September 3, 1935; 2,012,988, R. Chillingworth, September 3, 1935; and 2,012,989, R. Chillingworth, September 3, 1935.

One object of my invention is to provide rotor means for an aircraft, which in certain respects is like the rotor means of said patents, but which embodies novel structural and functional features of advantage thereover.

A further object is to provide such rotor means comprising either a single member, or oppositely rotatable members, each of which members has individually pivoted wing, plane, or blade elements, the pivoting axis of which elements is at an angle of substantially 45° to the longitudinal axis of the rotor, in conjunction with novel means for positionally adjusting the elements and automatically maintaining the elements in any positionally adjusted position.

Another object is to provide a novel aircraft embodying such improved rotor means.

An additional object is to provide an aircraft having a fuselage and a rotor of the improved type indicated, which rotor is operatively positioned beyond the fuselage in such manner that its longitudinal axis is normally in a certain angular relation with respect to the fuselage, in conjunction with novel control means for varying the angular relation of the rotor axis and fuselage, and control means for selectively effecting positional adjustment of all the wing, plane, or blade elements of the rotor.

It is also an object to provide an aircraft having a fuselage and rotor means of the improved type indicated, which rotor means in floatingly mounted on the aircraft in such manner that the rotor can be tilted in any direction about a pivotal point, thereby to effect angular positioning of the longitudinal rotor axis relative to the fuselage and corresponding directional flight of the aircraft.

Other objects are, to provide an aircraft having a fuselage and rotor means of the improved type indicated, in combination with one or more novel features, such as supporting means for the rotor mounted on the base structure of the fuselage in such manner that the longitudinal axis of the rotor is normally in substantially perpendicular relation with the fuselage, and which supporting means exerts a self-centering or self-adjusting action on the rotor so as to maintain its said relation with the fuselage; movable mechanical flight control means within the fuselage which is connected with said rotor supporting means and arranged to effect tilting of the rotor supporting means laterally in any direction from said perpendicular axis; electrical control means within the fuselage adapted to simultaneously effect positioning movement of all the wing elements in selective manner; and automatic means which functions to maintain the wing elements in any adjusted position.

With these and other objects in view, which will become more apparent from the following detailed description of one practical and illustrative embodiment of my improvements shown in the accompanying drawings, the invention comprises the novel rotor means, aircraft, elements, features of construction and arrangement of parts in cooperative relationship, as hereinafter more particularly defined by the claims.

In the drawings:

Fig. 8 is a plan sectional view, on an enlarged scale, taken substantially as indicated by the arrows 8—8 on Fig. 2.

In order to facilitate an understanding of my novel improvements, certain of the broader and more important aspects, phases and features thereof, will first be indicated. This will be followed by a detailed description of the construction and operation of the novel means of the invention, as cooperatively associated with an aircraft structure, one form of which has been more or less diagrammatically illustrated in the accompanying drawings for purposes of exemplification.

Accordingly, it is pointed out that in its broader aspects, my invention comprehends the embodiment, in an aircraft such as a helicopter or the like of the following main improvements:

1. Novel and improved rotor means of the general types forming the subject matter of the above referred to Chillingworth patents, which rotor means is movably mounted, or associated, with an aircraft, and normally maintained in a certain angular relation with the fuselage by self-centering or self-adjusting means, in such manner that the rotor head can be angularly adjusted selectively relative to the fuselage of the aircraft, for the purpose of determining the direction of flight of the aircraft, and the rotor head will thereafter be automatically returned to its normal angular relation with the fuselage.

2. Simple and efficient selectively operable control means for simultaneously varying the pitch of all the obliquely pivoted wing, plane, or blade elements of the said improved rotor means, in both directions.

3. Means adapted to automatically lock said elements in any selectively adjusted position.

4. Selectively operable directional flight control means adapted to be cooperatively associated with said improved rotor means, in such manner as to facilitate angular adjustment of the rotor head for the purpose indicated.

*The rotor means*

Figure 1:
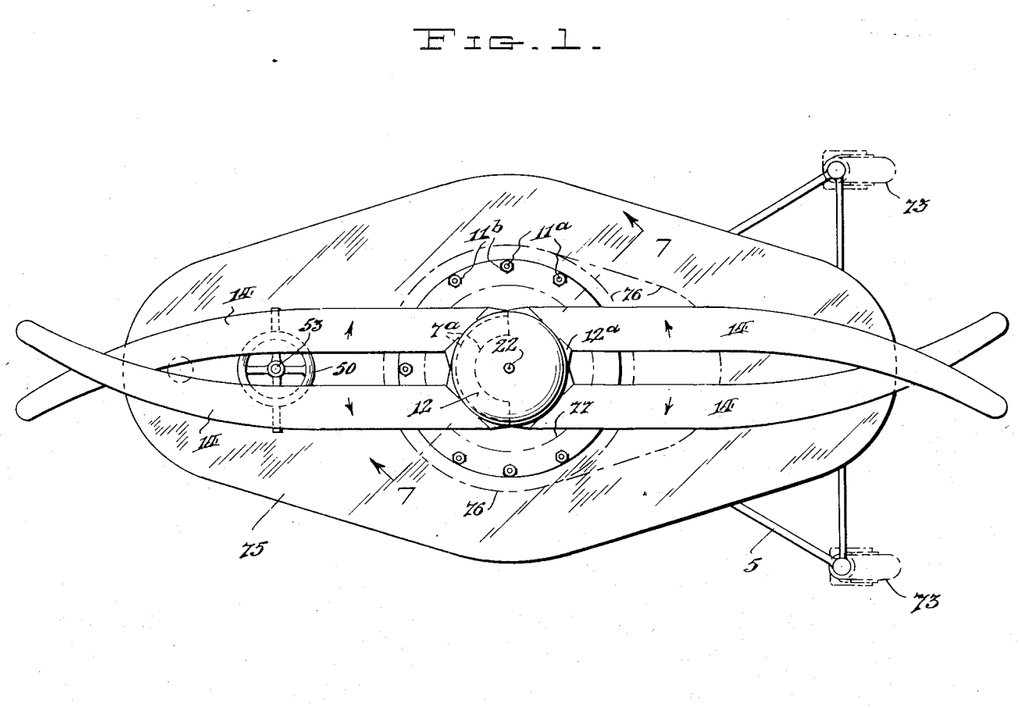
Figure 1 is a top plan view of an aircraft structure embodying one form of my invention.
Figure 2:
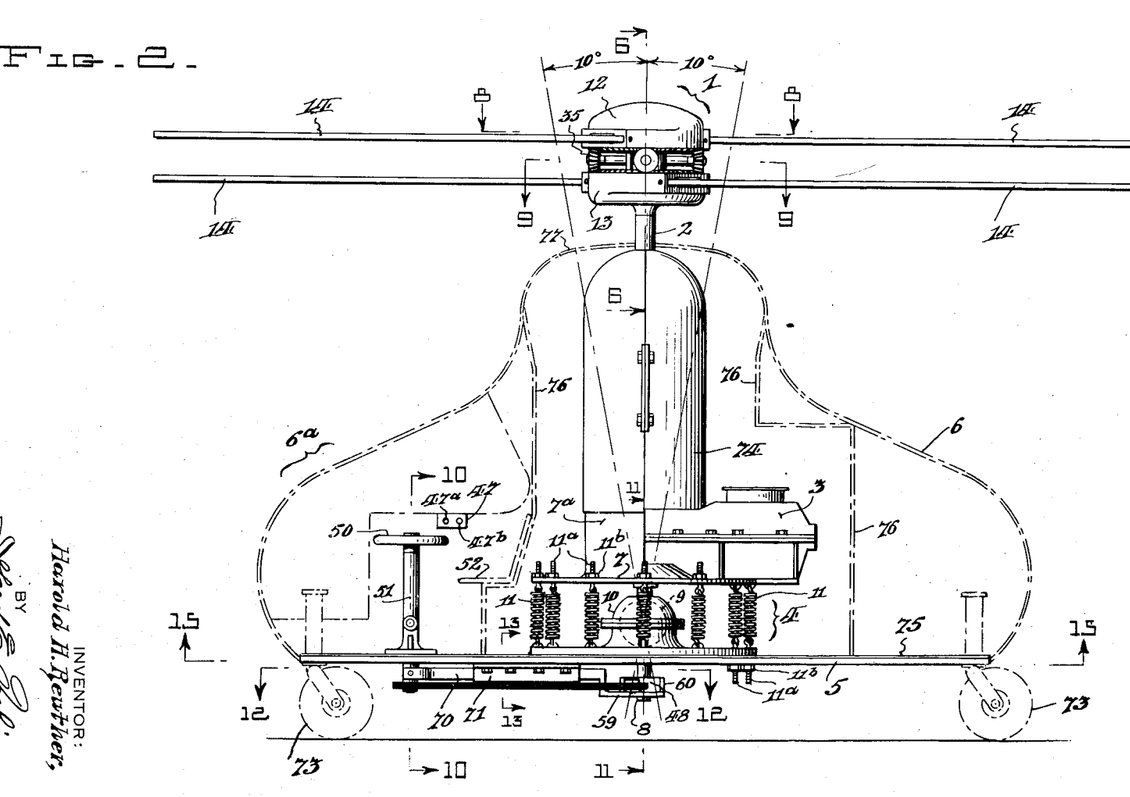
Fig. 2 is a side elevational view of the aircraft structure shown in Fig. 1.
Figure 11:
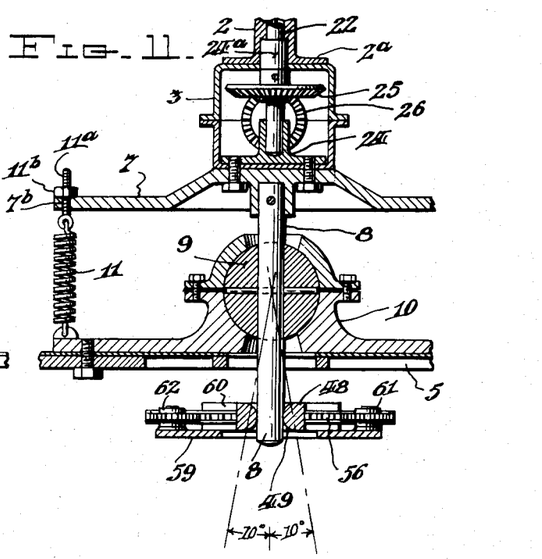
Fig. 11 is a vertical detail sectional view, taken substantially as indicated by the arrows 11—11 on Fig. 2.
Figure 15:
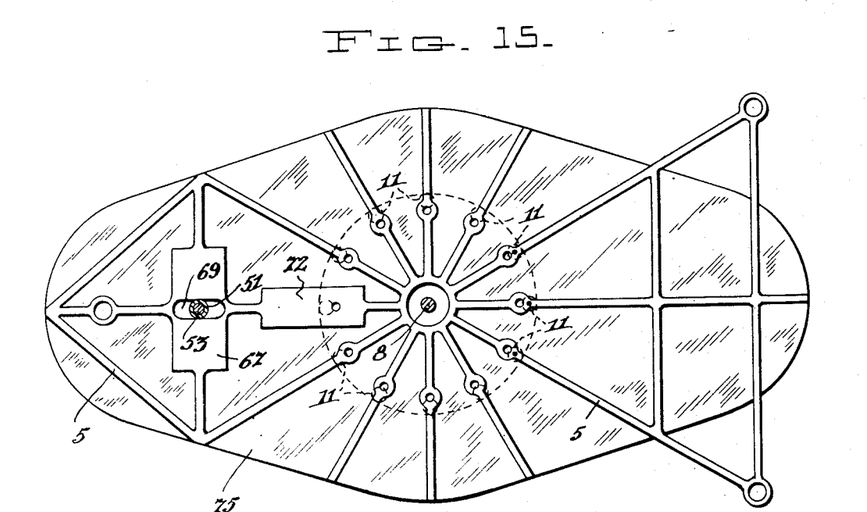
Fig. 15 is a bottom plan sectional view of the aircraft base structure, taken substantially as indicated by the arrows 15—15 on Fig. 2.

By referring to the drawings it will be noted that the improved rotor means of my invention generally comprises a rotor head 1, which is supported for rotation on a hollow post or sleeve 2, the lower flanged end 2ª of which is partly fixed to an engine or motor casing 3, and partly on a self-centering, or self-adjusting, ball joint unit generally indicated by the numeral 4, in turn rigidly connected to a base frame structure 5 of an aircraft body or fuselage 6. The ball joint unit 4 comprises a mounting platform 7, on which the motor casing 3 is supported, a semi-circular platform extension 7ª on which the flanged end 2ª of the post 2 is partly supported, a post 8, a metallic ball 9, a metallic split or two-part ball socket or bearing 10 and tension springs 11. The outer ends of the springs 11 are respectively connected to the platform 7, and base plate of the ball socket 10, in uniformly spaced and adjustable relation, as shown in Figs. 2, 11 and 15. This arrangement of the tension springs 11, permits their adjustment to effect uniform balancing of any uneven weight distribution of parts supported on the platform 7, and platform extension 7ª, thereby to effect and maintain the rotor head 1 in free floating perpendicular alignment with the center of the ball 9. Certain of the upper ends of the springs 11 are secured to bolts 11ª which freely pass through apertures 7ᵇ provided therefor in the platform 7. Tension adjusting nuts 11ᵇ, on the bolts 11ª, rest against the upper surface of the platform 7, so that by turning the nuts 11ᵇ one way or the other the tension of springs 11 can be increased or decreased at any point along the circumference of the platform 7. In those instances where the adjusting bolts 11ª cannot be projected above the platform 7, as at the location of the motor housing 3, they are projected below the frame 5, as indicated in Fig. 2, the tension adjusting nuts 11ᵇ then resting against the lower surface of frame members 5.

The lower free end of the post 8 which projects beyond the ball 9 and frame structure 5, is adapted to be engaged and adjustably moved laterally in any direction, by certain movement control means, as hereinafter more particularly explained in the descriptive section entitled "Directional Flight Control Means." Lateral movement of the said lower end of the post 8, will cause the ball 9 to be rotationally moved in its socket or bearing 10, and the parts supported on platform 7, including the rotor head 1, to be correspondingly tilted or shifted, but in reverse direction to the movement of the said lower end of the post 8. However, the springs 11 will at all times resist any tendency of the rotor head 1 to move away from its central position of perpendicular alignment with ball 9, and when the rotor head 1 is moved from said central position, the springs 11 will automatically act to return the rotor head 1 to said position.

The upper and lower sections of the metallic split, or two-part socket 10, are united by bolts, as clearly shown in Fig. 11, and may be formed to provide a slight separation therebetween, so that by tightening or loosening of the connecting bolts, the ball 9 may have a certain amount of frictional movement restraining action exerted thereon by the opposed separate parts of the socket 10, to the extent desired, in order that the free rotary movement of the ball 9 may be restrained to the proper degree for most efficient operation of the ball joint.

The rotor head 1 comprises two similar axially aligned complementary or segmental members 12 and 13, each of which is provided with a plurality of similar wing, plane, or blade elements 14. The members 12 and 13 are spacedly arranged and rotated in opposite directions, so that the upper member 12 functions as a lift propeller and the lower member 13 as a lift propeller and torque compensating propeller, in the usual manner of such arrangements. The members 12 and 13 are spaced apart the usual distance for best results in accordance with modern practice. The rotor head 1 may be moved or tilted laterally, in any direction, since the various rigidly united parts 2, 3, 7, 7a, 8 and 9, are arranged to support the rotor head 1, and are combinedly tiltable in any lateral direction from the perpendicular, because of their ball joint connection with the frame structure 5.

In the form of my invention illustrated, the rotor head 1 is considered to be in its normal positional relation with respect to the fuselage 6, when it is positioned and arranged to exert a perpendicular upward lifting force, so as to effect perpendicular upward flight of the aircraft, that is, when the longitudinal axis of the rotor head 1 is in perpendicular alignment or registry with the center of ball 9, as shown in Fig. 2. When it is desired that the rotor means effect flight of the aircraft in any particular horizontal direction, this is accomplished by lateral movement of the rotor head 1, so that its longitudinal axis will be inclined or tilted in said direction. Selective lateral movement, or tilting, of the rotor head 1, is attained in the manner, and by means which will become apparent as the description proceeds.

The side wall of the member 12 is enlarged or thickened at two diametrically opposed locations (see Fig. 8), as indicated by the reference character 12a, and each of these enlarged wall sections is similarly shaped and arranged to form a bearing section for pivotally supporting the inner ends of one of the wing, plane, or blade elements 14. The side wall of the member 13 is provided with similar enlargements, as indicated by the reference character 13a, also for the purpose of pivotally supporting the inner ends of the respective wing, plane, or blade elements 14, associated with the member 13. The circular inner wall edge of the member 12 is provided with bevel gear teeth 12b, and the corresponding oppositely arranged inner wall edge of the member 13 is provided with similar bevel gear teeth 13b.

The elements 14 are of standard or conventional construction and design, and produced in accordance with modern practice to function as wings, planes, or blades, and are preferably curved at their outer ends. The dimensions and structural qualities of the elements 14 are determined upon in accordance with modern practice, so that they are of the proper material, width and length, to effect the required lifting force, gliding action, and all other functions desired, when applied as an aircraft wing, plane, or blade element of the type here involved, and in the same manner as when such elements are combined with similar aircraft constructions for carrying out a lifting or other action when combined with a helicopter or the like.

Since all the elements 14 are similarly constructed and associated with their respective segmental rotor head members 12 and 13, and the latter are also alike in all substantial respects, a description of the cooperative association of elements 14, with the member 12, will suffice to make clear how the elements 14 and members 12 and 13 combinedly function as a wing system, propeller, or lifting screw arrangement. Accordingly, to avoid redundancy of descriptive matter, only the rotor head member 12 and wing elements 14 associated therewith, will be described in detail, the same reference numerals being used to indicate corresponding parts associated with the member 13. The points of variation, or difference, between the members 12 and 13 will thereafter be indicated.

Each of the enlarged sections 12a of the member 12, is provided with a central slot or opening 12c, and the wall portions adjacent to the openings 12c are provided with axially aligned bores 12d that extend at an angle of 45° with respect to the axis of rotation of the member 12, and are adapted to receive and frictionally retain therein the opposite ends of circular rods or spindles 15.

Figure 7:
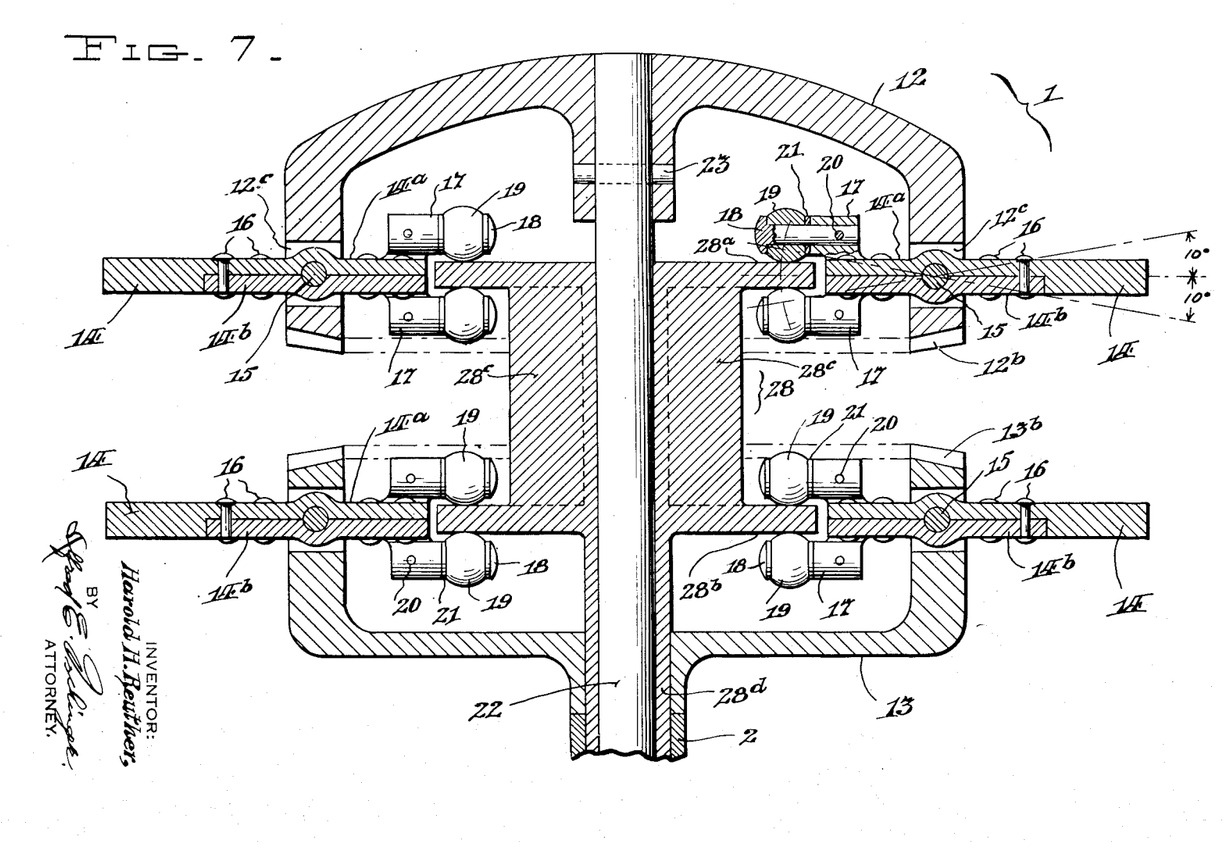
Fig. 7 is a vertical sectional view, on an enlarged scale, of the top portion, or head, of my improved rotor means, taken substantially as indicated by the arrows 7—7 on Fig. 1
Figure 9:
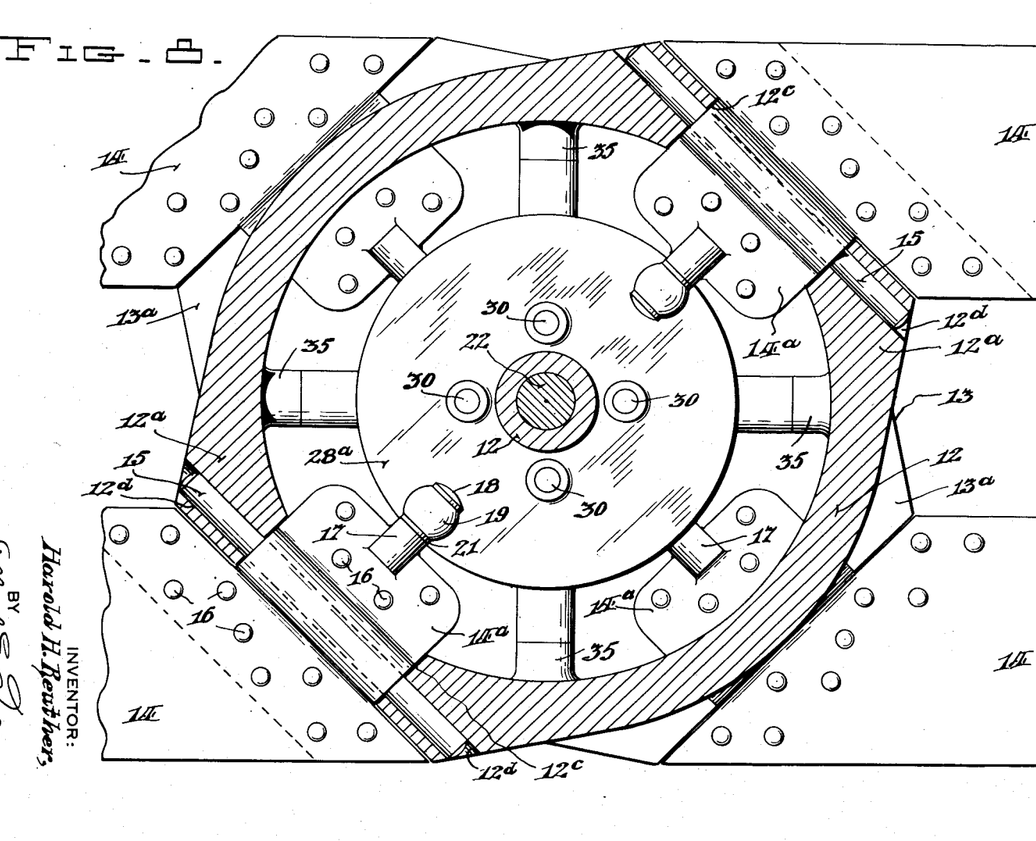
Fig. 9 is a plan sectional view, on an enlarged scale, taken substantially as indicated by the arrows 9—9 on Fig. 2.
Figure 10:
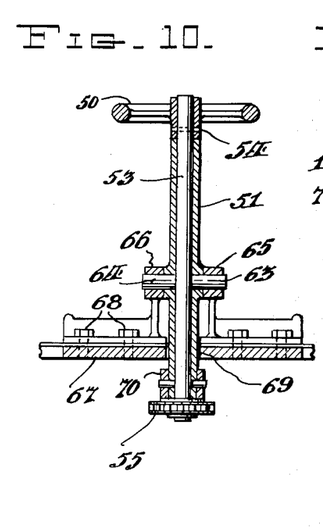
Fig. 10 is a vertical detail sectional view, taken substantially as indicated by the arrows 10—10 on Fig. 2.

By referring more particularly to Figs. 7 and 8, it will be apparent that the inner ends of the wing elements 14 that are associated with the member 12, are provided with angularly offset portions 14a of reduced width, adapted to extend through the openings 12c. The portions 14a are constructed and arranged as shown, and adapted to be hinged on the rods 15 in such manner as to have free pivotal or rocking movement on the latter. To facilitate assembly and connection of the portions 14a and rods 15, the top parts of the portions 14a may be integrally formed with the wing element 14, and provided with bottom cut-out sections adapted to have mounted therein separate correspondingly shaped interfitting inserts, or bottom parts 14b. The top part of each portion 14a is rigidly secured to its interfitting bottom part 14b by suitable means, such as rivets 16. Similar mounting members, or bosses 17 are integrally formed on the top and bottom parts 14a and 14b, in such manner that they are in superimposed parallelism relative to each other. The members 17 are provided with central bores into which extend the ends of headed spindle or axle elements 18, having mounted thereon for free rotation spherical rollers 19. The axle elements 18 are secured to the members 17 by pins 20, and one or more washers 21 may be mounted on the axle elements 18, adjacent to rollers 19, so as to reduce any binding tendency on the latter during their free rotational movement on the axle elements 18.

The member 12 is fixedly connected to the upper end of a drive shaft 22, by a pin 23, and the lower end of said shaft rests in a thrust bearing 24 secured to the inside of the motor casing 3. A bevel gear 25 is secured to the lower end of the drive shaft 22, which gear is arranged to mesh with a bevel pinion 26 secured to the motor shaft 27. A standard type thrust collar or anti-friction element 24a is positioned on the shaft 22 between the hub of bevel gear 25 and an inner shouldered bore portion of the post 2, so as to reduce the friction resulting from upward pull of the shaft 22. The shaft 27 extends from a gasoline engine or motor (not shown), provided within the casing 3, which motor is of standard or conventional construction and design and develops sufficient power to operate the rotor head 1 at desired speeds, all in accordance with the prevailing modern practice followed in effecting operation of the rotor head of the type here involved. The motor is also provided with the usual equipment and controls, such as a gasoline tank G, etc., required for its operation, all in accordance with such power units and arrangements, utilized in helicopters or other aircraft of this general type. The bevel gear 25 and the bevel pinion 26 are of the proper ratio so that the motor will effect rotation of the member 12 at the speeds desired.

Figure 6:
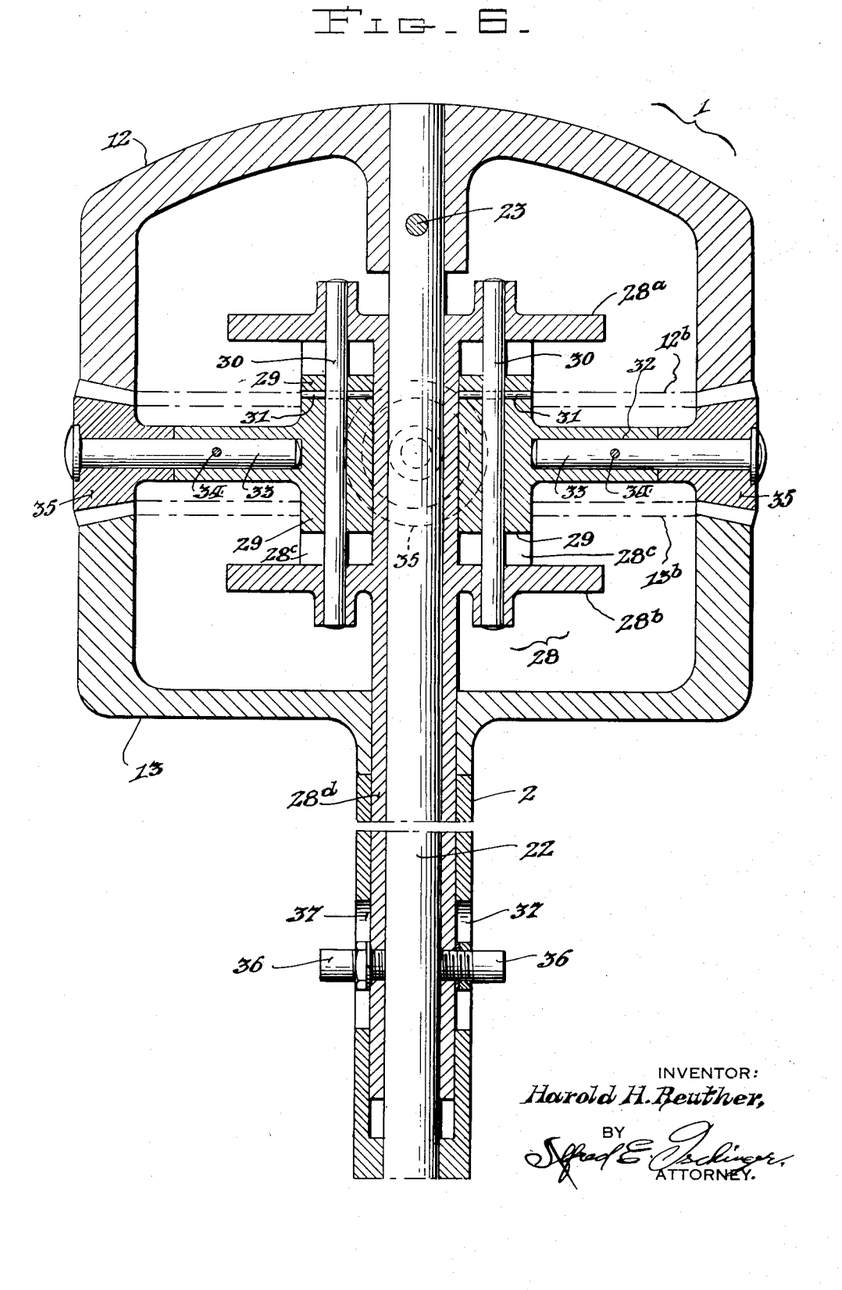
Fig. 6 is a vertical detail sectional view, on an enlarged scale, taken substantially as indicated by the arrows 6—6 on Fig. 2.

Slidably movable on the upper end of the drive shaft 22, within the rotor head 1, is a slide unit 28, comprising two horizontally arranged circular disc-like members 28ª and 28ᵇ, (see Fig. 7), spacedly joined by four vertically extending walls or partitions 28ᶜ, between which are mounted for free vertical sliding movement four similar blocks 29. Each of the blocks 29 has vertically extending therethrough a rod 30 which is fixedly connected with its respective block 29 by a pin 31, and the upper ends of these slide rods are adapted to freely move in suitable slide bearings provided therefor on the member 28ª, whereas the lower ends of said rods are adapted to freely move in similar slide bearings provided for this purpose on the member 28ᵇ, as clearly shown in Fig. 6. Each of the blocks 29 is provided with a lateral extension or boss having a bore 32 in which is fixedly mounted a headed rod 33, by means of a pin 34. On the outer ends of the rods 33 are mounted for free rotation similar bevel pinions 35, adapted to simultaneously mesh with the similar bevel gear teeth 12ᵇ and 13ᵇ on the oppositely arranged free wall edges of the members 12 and 13. The slide unit 28 has integrally united therewith a sleeve 28ᵈ, which extends from the member 28 downwardly along the shaft 22 a substantial distance, and has fixedly connected therewith, near its lower end, at diametrically opposite points, two similar studs 36, arranged to project outwardly from the sleeve 28ᵈ through slots 37 in the stationary hollow post 2.

The member 13 is freely rotatable on the sleeve 28ᵈ and rotation of the member 12 in one direction by the drive shaft 22, will cause rotation of the member 13 in the opposite direction, reverse rotary movement being transmitted at all times from the member 12 to the member 13 through the bevel pinions 35 which are freely rotatable on their respective axle rods 33 projecting from the stationary blocks 29. During the time that the members 12 and 13 are rotating in opposite directions, the rollers 19 ride along the outer portions of the upper and lower surfaces of the vertically moveable, non-rotatable disc-like members 28ª and 28ᵇ. When the members 28ª and 28ᵇ are in the positions shown in Fig. 7, the wing elements 14 will be held, or maintained, by the rollers 19 in a horizontal or central position. The pitch of all the elements 14 can be simultaneously changed, by movement either upwardly, or downwardly, of the slide unit 28 on the shaft 22. During such wing pitch changing movement of the slide unit 28, the slide blocks 29 will remain stationary, that is, the four vertically extending walls 28ᶜ will slidingly pass up or down along the sides of the blocks 29 and the pinions 35 will constantly remain in their positions of free rotation between the gear teeth 12ᵇ and 13ᵇ on the members 12 and 13. The slide unit 28 is movable vertically on the shaft 22, up or down, to the limited extent determined by similar movement of the studs 36 in the slots 37 of the stationary post 2, but during such movement the blocks 29 will remain stationary relative to the other parts of the unit 28.

The wing element pitch control means

Figures 3, 4, 5:
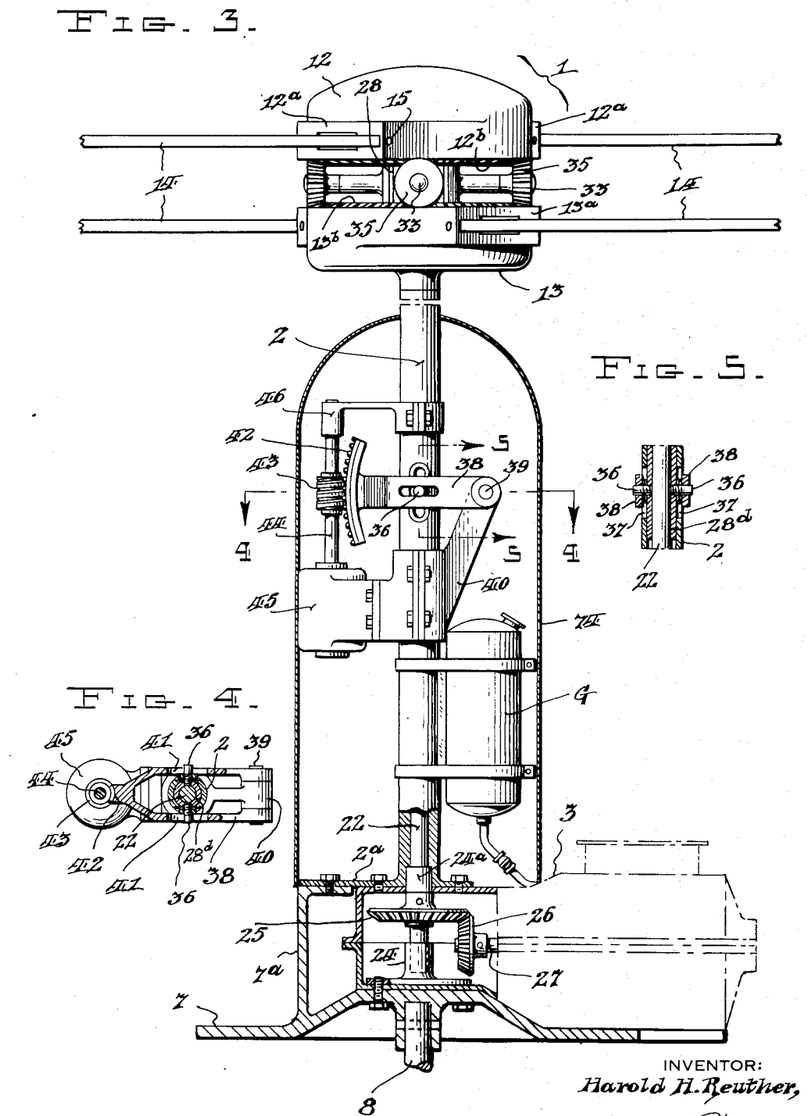
Fig. 3 is a partial vertical side elevational view, on an enlarged scale, of the rotor means of my invention, with certain parts thereof broken away and others shown in section, to more fully disclose various details and features thereof.
Fig. 4 is a cross-sectional detail view, taken substantially as indicated by the arrows 4—4 on Fig. 3.
Fig. 5 is a vertical detail sectional view taken substantially as indicated by the arrows 5—5 on Fig. 3.

The studs 36, sleeve 28ᵈ and unit 28, are arranged to be unitedly moved vertically on the shaft 22, either upwardly or downwardly, by a double arm yoke or lever 38, which is pivotally mounted at 39 on a two-part support 40 clampingly secured to the post 2, as clearly shown in Fig. 3. Each arm of the lever 38 is provided with a slot 41 through which the studs 36 extend, and the front free end of the lever 38 is provided with a worm gear segment 42. The worm segment 42 meshes with a worm gear 43, fixed to a shaft 44 operated by an electric reversing type motor 45. The motor 45 is secured to the bearing 40, and one end of the shaft 44 is mounted for rotation in a bearing 46 secured to the post 2. The motor 45 is operatively controlled by a double push-button type switch 47, mounted in the front control section of the fuselage 6, within easy and convenient reach of the operator. The motor 45 is operatively connected to a source of electrical energy, such as an electrical storage battery B, by conductors arranged and connected in usual and well known manner, as clearly shown in Fig. 14.

Figure 14:
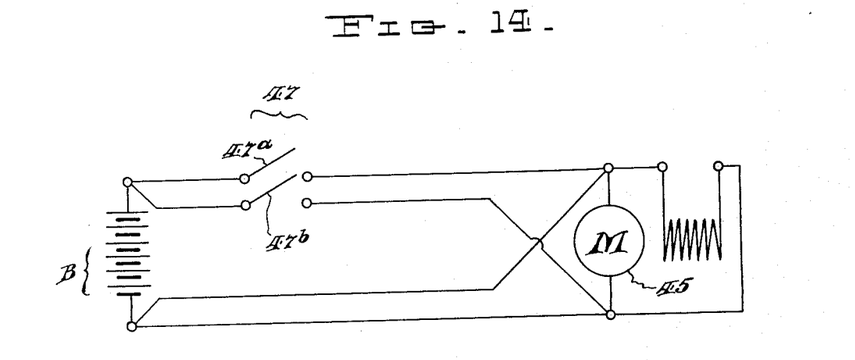
Fig. 14 is a wiring diagram of the reversible electrical motor arrangement and control therefor, provided to operate the adjustable positioning means for the wing, plane, or blade elements of the rotor means.

By referring to the wiring diagram shown in Fig. 14, it will be clear that when one of the push-buttons 47ª of the switch 47 is operated, the electric current flow through the motor 45 will be in one direction, and this will cause rotation of the shaft 44 in one direction. By operating the other push-button 47ᵇ of the switch 47, rotation of the motor 45 and shaft 44, will take place in the opposite direction. Accordingly, when it is desired to simultaneously vary the angular pitch of all the wing elements 14, this is accomplished by selectively operating the two push-buttons 47ª and 47ᵇ of the switch 47, so as to effect upward or downward shifting of the slide unit 28. Since the rollers 19 at all times ride on the disc-like members 28ª and 28ᵇ of the member 28, the wing elements 14 will have imparted thereto a corresponding tilting movement. In this manner, the angle of incidence, and the dihedral angle of each wing element 14 can be simultaneously adjusted, either upwardly, or downwardly. After each operation of a push-button of the switch 47, the wing elements 14 will be fixedly maintained in their respective adjusted position, since the worm gear 43 and worm gear segment 42 will function to lock the sleeve 28ª and associated parts, in the adjusted position to which they have been moved.

Directional flight control means

As previously indicated, the lower free end of the post 8, which projects beyond the ball 9 and frame structure 5, is adapted to be engaged and adjustably moved laterally in any direction, by certain movement control means, thereby to tilt the rotor head 1 toward the horizontal direction in which it is desired to effect flight of the aircraft. Various movement control means may be utilized to so actuate the lower free end of the post 8, and one mechanical form of such means is illustrated in the drawings for purposes of exemplification.

The form of such means shown, generally comprises a slide collar or block 48, having a central aperture 49 through which the lower end of post 8 extends, and which collar 48 is adapted and arranged to be laterally moved in a horizontal plane, in any direction, by rotary movement of a steering wheel 50, and a pivotally mounted steering post or lever 51, located in the forward control section of the fuselage 6, directly in front of a seat 52 for the aircraft operator.

The wall forming the aperture 49 in the collar 48, is vertically curved or rounded to avoid binding action between the wall of said aperture and the portion of the post 8 which extends therethrough, when the collar 48 is moved horizontally in any particular direction.

The collar 48 is moved in its horizontal plane in a crosswise direction relative to the fuselage 6, by rotary movement of the steering wheel 50. To move the block 48 in its horizontal plane in a longitudinal direction relative to the fuselage 6, the steering post 51 is tilted forwards or backwards in its pivotal mounting. To effect movement of the collar 48 in its horizontal plane, to any intermediate position between said crosswise and longitudinal positions effected by operating only the steering wheel 50, or steering post 51, both of the latter may be operated so as to move the collar 48 to said intermediate position. Accordingly, the collar 48 can be selectively moved from its normal central position of perpendicular registry with the ball 9, in a horizontal plane, to any radial location from said normal central position throughout a complete circle of 360°. This will become apparent from the following description of the motion transmitting mechanism which operatively connects the collar 48 with the steering wheel 50 and steering post 51.

Figure 12:
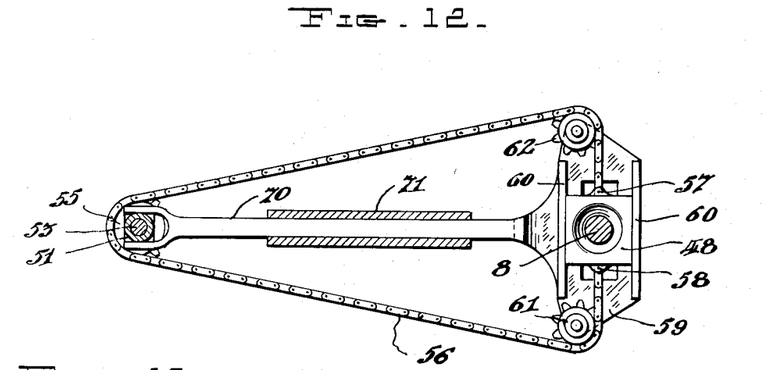
Fig. 12 is a detail sectional view, taken substantially as indicated by the arrows 12—12 on Fig. 2.
Figure 13:
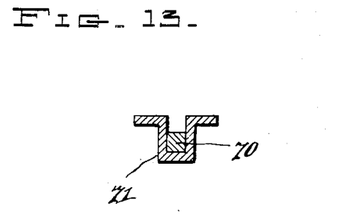
Fig. 13 is a vertical detail sectional view, taken substantially as indicated by the arrows 13—13 on Fig. 2.

The steering wheel 50 is secured to the upper end of a shaft 53 by a pin 54. The shaft 53 is freely rotatable in the hollow steering post 51, and has fixedly secured to the lower end thereof a chain sprocket wheel 55, around which is trained a sprocket chain 56 the free ends of which are pivotally secured to opposite sides of the collar 48, as indicated at 57 and 58 in Fig. 12. The lower surface of the collar 48 rests upon the upper surface of a horizontally arranged member 59, having two integral vertically extending guide walls 60—60 formed thereon, between which the flat sides of the collar 48 are arranged to be slidably moved in a crosswise direction relative to the fuselage 6. In order that rotary movement of the steering wheel 50 may cause the sprocket chain 56 to move the collar 48 in a straight line, the chain 56 is trained about two freely rotatable sprocket wheels 61 and 62 mounted at opposite ends of the member 59. This will effect a straight-line pull by the chain 56 on the collar 48, in one direction or the other, whenever the steering wheel 50 is operated.

The hollow steering post 51, is provided with trunnions 63 and 64, which extend into bearings 65 and 66 the lower portions of which are shaped to form foot rests for the aircraft operator, and are rigidly secured to an enlarged solid section 67 of the frame structure 5 by bolts 68. A longitudinally arranged slot 69 is formed in the frame section 67 through which extends the lower end of the post 51. The lower end of the post 51 has pivotally secured thereto the forked forward end of a flat-sided rod 70, arranged to be freely slidable lengthwise in a bearing 71, bolted or otherwise firmly secured to an enlarged solid section 72 of the frame structure 5. The rod 70 is integrally united with the member 59, so that when the steering post 51 is moved backwards or forwards about its pivotal point, the rod 70, member 59 and collar 48, will be correspondingly moved.

Accordingly, forward and backward movement of the collar 48 is controlled by the steering post 51, and transverse movement of the collar 48 is controlled by the steering wheel 50. In this connection it is to be noted that movement of the collar 48 to any selected position, by the steering wheel 50 and steering post 51, is resisted by the springs 11 of the self-centering ball joint unit 4, which act at all times to urge the rotor head 1 towards its normal position of perpendicular alignment with the ball 9. Should the aircraft operator release his hold on the steering wheel 50, so that both the latter, and the steering post 51 are free of any restraining, or holding action by the operator, the springs 11 of the self-centering ball joint unit will consequently act to return the rotor head 1, steering wheel 50, and steering post 51 to their normal or neutral positions occupied by these parts when set for perpendicular flight of the aircraft. This feature of my invention is believed to be of real significance, since any development during flight of the aircraft, which will cause the operator to release the steering wheel 51, will immediately effect automatic setting of the rotor head 1 to its perpendicular flight position. In other words, if for any reason, the operator should release his hold on the steering wheel 51, during a time that the aircraft is in flight in a direction other than perpendicular flight, the rotor head 1 will be automatically moved to its perpendicular flight position, and the aircraft will either hover in the air, or move upwardly, or downwardly, depending upon the speed at which the wing elements 14 are rotating, and their pitch adjustment, at that time.

*Modifications*

It will be understood by those skilled in this art, that the various novel improvements of my invention as herein disclosed, may be embodied in various types of aircraft body or fuselage structures, and that the particular fuselage 6, indicated in dot-and-dash outline in the drawings, is merely intended as indicative of one illustrative form of such fuselage structure. However, it is, of course, desirable that the type fuselage selected, be provided with features in accordance with modern practice, such as a nose, or front end construction 6ᵃ, of plastic or other type transparent material which provides unobstructed visibility for the pilot, or aircraft operator, in all directions. The wheels 73 of the landing gear arrangement, are also constructed and located in accordance with modern practice, and if desired, a thin cover 74, of light metal, plastic material, etc., can be secured in place as shown in Figs. 2 and 3, to protect certain parts of the rotor means. The base frame structure 5, more particularly illustrated in Fig. 15, may be made of light weight metallic frame sections, arranged substantially as shown, and welded together, or otherwise united to form a rigid and strong base frame. A lightweight sheet metal floor plate, or other suitable covering 75, is fixedly secured to the frame 5, in any known practical manner, as by riveting or welding.

The parts of the rotor means between the rotor head 1 and frame 5, may be enclosed within a central chamber of the fuselage 6, as indicated by the vertical wall structure 76, provided with a circular opening 77 at the top to permit unobstructed movement of the post 2 in any direction.

As indicated in Fig. 2, the rotor head 1 may be angularly tilted 10 degrees in any direction from its normal perpendicular position. As indicated in Fig. 7, the wing, plane, or blade elements 14 are also angularly adjustable upwards or downwards about their pivot pins 15, 10 degrees from their normal horizontal position. These angular limits of adjustment are believed to be sufficient for proper operation of an aircraft provided with the improvements of my invention. However, it will be understood that increasing or decreasing these limits can readily be effected, if desired, by usual design expediency.

The improvements herein disclosed can be otherwise changed and modified in various ways, without departing from the scope of the invention which is more particularly indicated by the hereto appended claims.

I claim:

1. An aircraft comprising a supporting base; a body structure supported on said base; a drive shaft extending through and above said body structure, a ball and socket anchoring member mounted on said base, a platform tiltably supported on said ball and socket member spaced from said base; driving means supported on said platform; bearing means provided on said platform for rotative support of said shaft, operative connecting means between said driving means and said shaft for rotation of said shaft, yielding positioning means interposed between said platform and said base to hold said shaft and its driving means in predetermined angular positions on said base in said body structure during rotation thereof and wing members supported by said shaft and mounted thereon for rotation therewith.

2. An aircraft comprising a base, a body structure supported on said base; a drive shaft; universal mounting means for rotative and angularly tiltable support of the end of said drive shaft on said base, a rotor carried by said shaft; wing members pivoted obliquely on said rotor, motor driving means and wing operating means jointly supported with said shaft on said universal mounting means so as to bodily tilt with said shaft within said body structure; operative connecting means between said shaft and said driving means, and operative connecting means between said wing members and said wing operating means.

HAROLD H. REUTHER.

REFERENCES CITED

The following references are of record in the file of this patent:

UNITED STATES PATENTS

| Number | Name | Date |
|---|---|---|
| 1,294,361 | Nash | Feb. 11, 1919 |
| 1,491,310 | Perrin | Apr. 22, 1924 |
| 1,955,501 | Jette | Apr. 17, 1934 |
| 2,012,989 | Chillingworth | Sept. 3, 1935 |
| 2,074,342 | Platt | Mar. 23, 1937 |
| 2,163,481 | Cameron | June 20, 1939 |
| 2,264,943 | Larsen | Dec. 2, 1941 |
| 2,350,126 | Pitcairn | May 30, 1944 |
| 2,415,999 | Frasher | Feb. 18, 1947 |
| 2,437,700 | McFarland | Mar. 16, 1948 |
| 2,464,285 | Andrews | Mar. 15, 1949 |
| 2,475,293 | Pentecost et al. | July 5, 1949 |

FOREIGN PATENTS

| Number | Country | Date |
|---|---|---|
| 521,218 | Great Britain | May 15, 1940 |
| 545,789 | France | Aug. 2, 1922 |